United States Patent Office.

HENRY M. JOHNSTON AND FREDERICK BECK, OF NEW YORK, N. Y.

Letters Patent No. 109,416, dated November 22, 1870.

IMPROVEMENT IN THE PREPARATION OF MICA.

The Schedule referred to in these Letters Patent and making part of the same.

*To all whom it may concern:*

Be it known that we, HENRY M. JOHNSTON and FREDERICK BECK, both of the city, county, and State of New York, have invented a new and improved Process of Preparing Mica for use in the arts; and we do hereby declare that the following is a full, clear, and exact description thereof.

We take mica and place it in a furnace or other suitable appliance, and subject it to the action of intense heat for a period varying from about ten minutes to an hour or more, according to the degree of heat and the quality of mica used. We prefer to use a white heat to that of a lower temperature. After about ten minutes' exposure to the heat, the mica is found to have parted with its transparency, and to have acquired a silvery appearance of a high reflective quality; a more prolonged action of the heat imparts a beautiful pearly luster, which changes under a further exposure to a milk-like quality of color. As these changes take place the mica is found to gradually increase in thickness, and after reaching the milky color, the laminæ, of which it is composed, will have lost their adhesion to such a degree as to be easily separated by pressure between the fingers, in which condition we reduce it to scales, by forcing through sieves of different sizes, or by any other suitable means.

The mica scales so produced can be stained of any desired color by the use of suitable dyes, and then be used in place of bronze powders.

By the use of our invention we are further enabled to prepare sheets of mica that can be used instead of metal for reflectors, and for many ornamental purposes.

We are aware that mica has been prepared by reducing it to small pieces in a stamping-mill, digesting with chlorhydric acid, and cleansed by washing, all of which we disclaim; but Having described our invention,

What we claim as new, and desire to secure by Letters Patent, is—

1. The process herein described for preparing mica in sheets or fine scales.

2. Mica in sheets or fine scales, prepared substantially as described.

HENRY M. JOHNSTON.
FRED. BECK.

Witnesses:
J. H. LANGE,
A. B. TERRY.